(12) United States Patent
Del Castillo

(10) Patent No.: US 9,874,307 B1
(45) Date of Patent: Jan. 23, 2018

(54) PORTABLE STAND SYSTEM WITH TWO PLAQUES

(71) Applicant: Nestor Del Castillo, San Juan, PR (US)

(72) Inventor: Nestor Del Castillo, San Juan, PR (US)

( * ) Notice: Subject to any disclaimer, the term of this patent is extended or adjusted under 35 U.S.C. 154(b) by 0 days.

(21) Appl. No.: 15/208,716

(22) Filed: Jul. 13, 2016

(51) Int. Cl.

| | |
|---|---|
| *F16M 11/00* | (2006.01) |
| *A47J 47/16* | (2006.01) |
| *A45D 19/04* | (2006.01) |
| *F16M 13/00* | (2006.01) |
| *F16M 11/22* | (2006.01) |
| *A47G 23/02* | (2006.01) |
| *A47G 29/02* | (2006.01) |
| *E04G 3/20* | (2006.01) |
| *E06B 7/28* | (2006.01) |
| *A47B 91/00* | (2006.01) |
| *A47G 29/00* | (2006.01) |
| *B65D 19/00* | (2006.01) |
| *A47B 97/04* | (2006.01) |
| *A63H 33/08* | (2006.01) |
| *A63F 9/08* | (2006.01) |
| *A63H 33/10* | (2006.01) |
| *A47B 47/04* | (2006.01) |
| *A63F 9/12* | (2006.01) |
| *A63H 33/06* | (2006.01) |

(52) U.S. Cl.
CPC .............. *F16M 13/00* (2013.01); *A45D 19/04* (2013.01); *A47J 47/16* (2013.01); *F16M 11/00* (2013.01); *F16M 11/22* (2013.01); *A47B 47/042* (2013.01); *A47B 2230/0085* (2013.01); *A63F 9/12* (2013.01); *A63F 2009/1228* (2013.01); *A63H 33/06* (2013.01); *A63H 33/08* (2013.01); *A63H 33/084* (2013.01); *A63H 33/105* (2013.01)

(58) Field of Classification Search
CPC ...... A63H 33/06; A63H 33/084; A63H 33/04; A63H 33/082; A63H 33/086; A63H 33/105; A63H 33/08; A63F 9/12; A63F 2009/1228; A47B 2230/0085; A47B 47/042; F16M 11/22; F16M 13/00; F16M 11/00
USPC ........ 273/160, 156; 446/108, 114, 124, 125, 446/127, 128; 248/150, 160, 247, 248, 248/346.3, 346.4, 459, 460, 174, 529
See application file for complete search history.

(56) References Cited

U.S. PATENT DOCUMENTS

| | | | | |
|---|---|---|---|---|
| 2,027,885 A | * | 1/1936 | Schwarzbach | A63H 33/06 446/105 |
| 2,454,231 A | * | 11/1948 | Stoick | A47G 33/12 248/523 |
| 3,069,216 A | * | 12/1962 | Vaeth | A47B 47/042 108/158.12 |
| 4,055,019 A | * | 10/1977 | Harvey | A63F 9/12 220/315 |
| 4,153,311 A | * | 5/1979 | Takahashi | A47B 47/042 108/162 |

(Continued)

*Primary Examiner* — Leslie A Nicholson, III
*Assistant Examiner* — Taylor L Morris
(74) *Attorney, Agent, or Firm* — Eugenio J. Torres-Oyola; Victor Rodriguez-Reyes; Ferraiuoli LLC

(57) ABSTRACT

Portable stand system consists of two rigid plaques with perforated slots designed to interlock the two plaques into various configurations. The way to assemble the two plaques is by inserting them using the perforations indistinctively in order to achieve different x-shaped configurations according to the needs of the used. The system allows objects to be rearranged from their original position and/or angle.

1 Claim, 4 Drawing Sheets

(56) References Cited

U.S. PATENT DOCUMENTS

| | | | | |
|---|---|---|---|---|
| 4,267,998 | A * | 5/1981 | Weirich | A47B 3/06 108/158.12 |
| 5,303,829 | A * | 4/1994 | Kennedy | A47F 7/06 211/30 |
| 5,335,753 | A * | 8/1994 | Campbell | B25H 1/06 182/151 |
| 5,833,512 | A * | 11/1998 | Nicola | A63H 33/08 446/114 |
| 5,895,045 | A * | 4/1999 | Vilar | A63H 33/06 273/160 |
| 6,557,278 | B1 * | 5/2003 | Huang | B65D 73/00 40/124.01 |
| 6,684,591 | B2 * | 2/2004 | Jean | A63H 33/06 206/176 |
| 6,819,548 | B2 * | 11/2004 | Hillis | A47B 23/042 361/679.44 |
| 7,114,300 | B1 * | 10/2006 | Culp | A47B 47/042 211/184 |
| 8,359,985 | B2 * | 1/2013 | Wangdak | A47B 47/042 108/158.12 |
| 2003/0162473 | A1 * | 8/2003 | Yang | A63H 33/08 446/108 |
| 2006/0284372 | A1 * | 12/2006 | Matilla | A63H 33/084 273/236 |
| 2007/0214741 | A1 * | 9/2007 | Llorens Miravet | E04F 15/02 52/592.1 |
| 2009/0321605 | A1 * | 12/2009 | Petrie | F16M 13/00 248/452 |
| 2014/0248113 | A1 * | 9/2014 | Phillips | B25B 11/00 414/800 |
| 2015/0258843 | A1 * | 9/2015 | Geiser | B44C 3/12 428/99 |

* cited by examiner

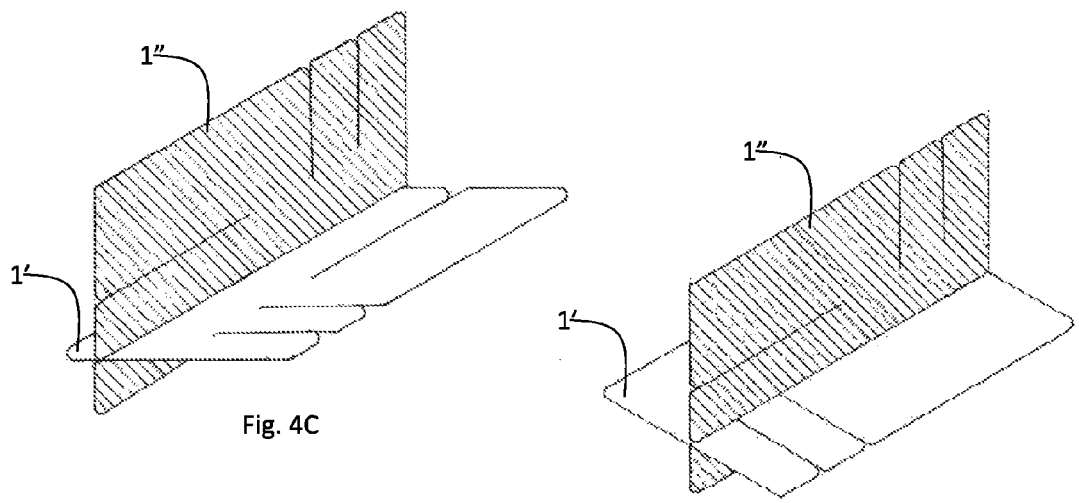
Fig. 4C
Fig. 4D
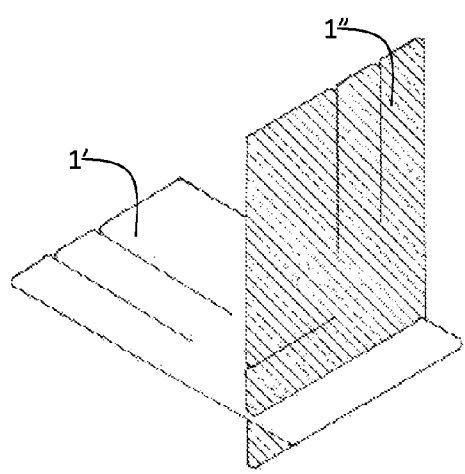
Fig. 4E
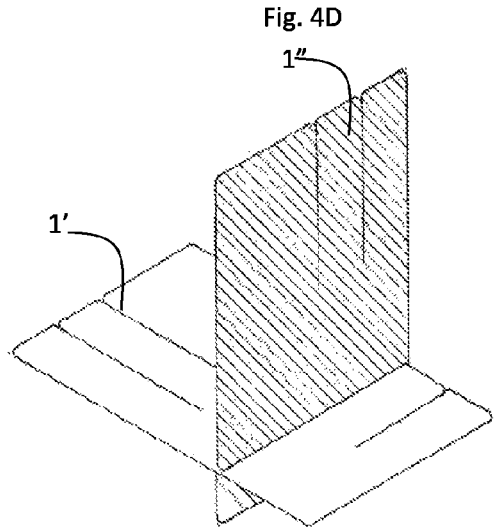
Fig. 4F

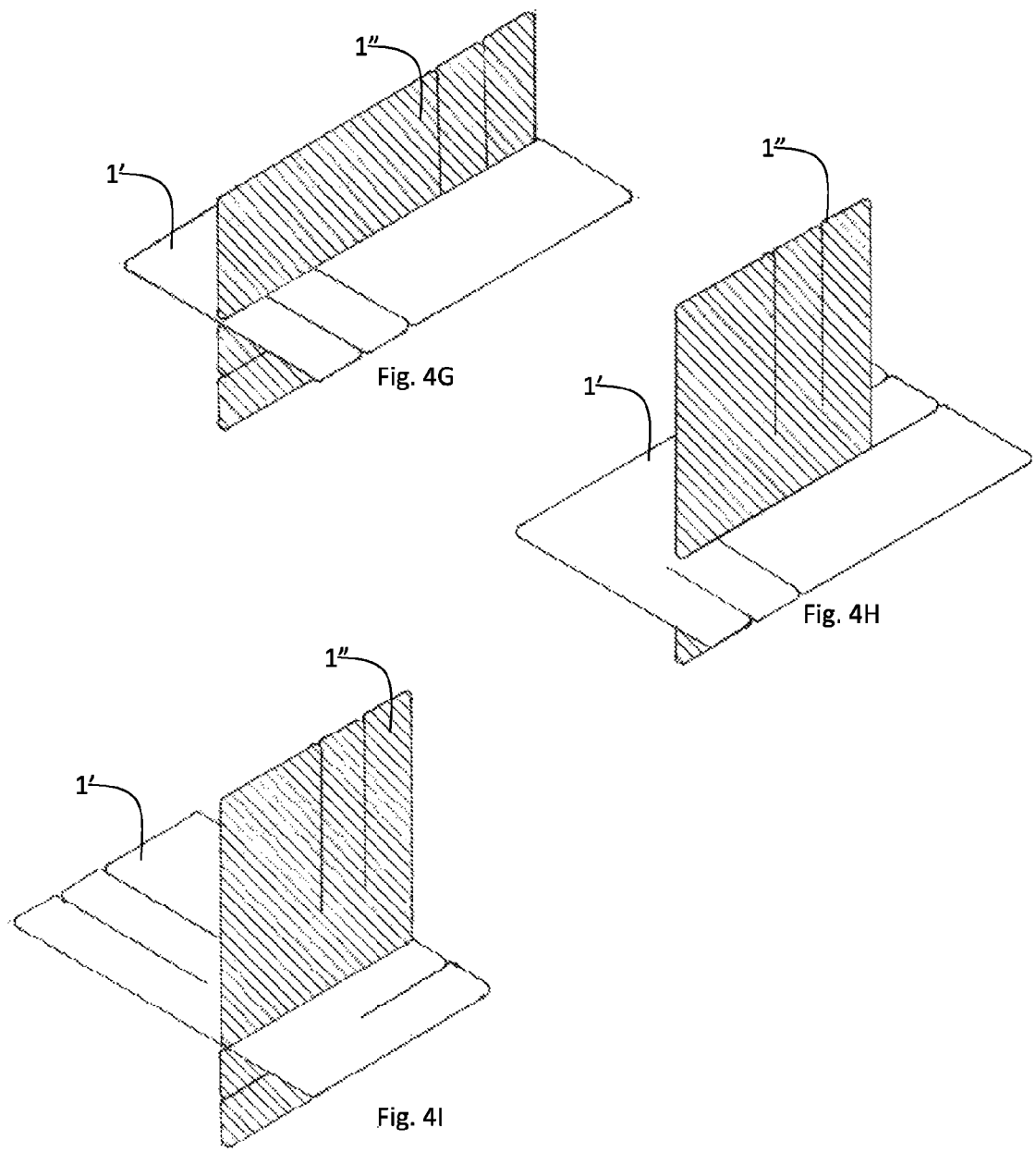

PORTABLE STAND SYSTEM WITH TWO PLAQUES

CROSS-REFERENCE TO RELATED APPLICATION

N/A

STATEMENT REGARDING FEDERALLY SPONSORED RESEARCH AND DEVELOPMENT

N/A

BACKGROUND OF THE INVENTION

Field of the Invention

The present invention relates to a portable stand system comprised of two rigid plaques with perforated slots designed to interlock the two plaques into various configurations.

Discussion of the Background

Currently there are different types of small objects holders for devices such as smart phones, utensils or other types of artefacts that need holders to be functional or to be placed above where it is placed originally. Prior art found on this subject result to be bulky, rigid and complicated methods that make difficult the process of reproduction and also the handling of the pieces.

In light of the above shortcoming of the method available to hold objects, this new device overcomes them by the simplicity of its construction and method of assembly.

SUMMARY OF THE INVENTION

The primary objective of this invention is to present a simple device and method to place or rest artefacts, such as utensils or mobile devices, in an easy and simple way that do not complicate the handling.

It is an object of the present disclosure to provide a holder for small items convenient for travel. The simplicity of the exemplary embodiment in accordance with the principles of the present disclosure provide advantages for the holder's construction or process of reproduction, since being two identical plaques with slots placed strategically assists with the manufacturing process. Also, the configuration is an advantage for the assembling process because it can be used to place different types of objects in many different ways.

To enable a better understanding of the objective and features of the present invention, a brief description of the drawing below will be followed with a detailed description of invention.

BRIEF DESCRIPTION OF THE DRAWINGS

FIG. 4A to 4I disclose different alternate configurations for the assembling of at least two plaques, that always result in perpendicular arrangements.

DETAILED DESCRIPTION OF THE INVENTION

The preferred embodiment in accordance with the principle of the present disclosure includes at least a pair of flat surfaces 1', 1", such as a plaque, wherein each plaque 1 is intended to have a preselected size. For example the plaques 1 can have a standard size to be inserted in a wallet, such as a credit card, in order to carry the system at all times. The plaques 1 are made of a rigid material, for example the plaques 1', 1" are preferred to be constructed of aluminum in order to provide a rigid structure while avoiding demagnetization of credit cards placed adjacent to the plaques 1', 1".

Figure 1:
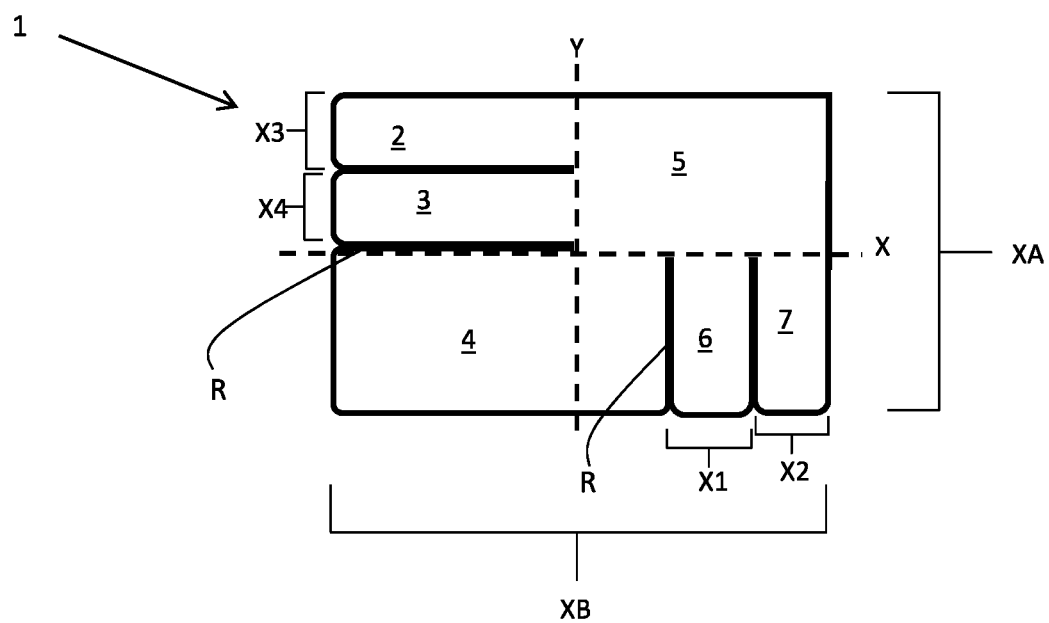
FIG. 1 is a plan view of the structure of the first preferred embodiment of the present invention.

FIG. 1 discloses a plaque 1 comprising at least a first pair of extended flat surfaces 2, 3, a first flat surface 4, a second a flat surface 5 and at least a second pair 6, 7 of extended flat surfaces, wherein said second pair of extended flat surfaces 6, 7 are perpendicular to the first pair of extended flat surface 2, 3. The first pair of extended flat surface 2, 3 comprises extended flat surfaces having a predefined width x3, x4. Similar each flat surface of said second pair of extended flat surfaces 6, 7 comprises a predefined width x1, x2. The recess or slot R between the extended flat surfaces is enough to provide space for the plaque thickness XC for pass through said recess. The arrangement between plaques 1', 1" is best shown in FIGS. 4A through 4I.

Figure 2:
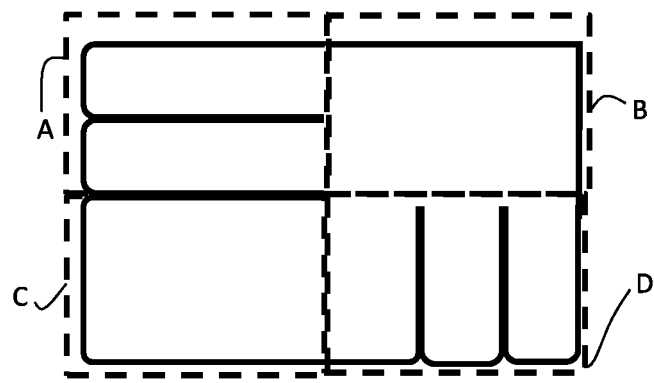
FIG. 2 is a plan view of the structure of the first preferred embodiment of the present invention including quadrants.

Accordingly each plaque 1 is divided into quadrants as show in FIG. 2. Top half left is quadrant A, right is quadrant B, bottom half left is quadrant C, right is quadrant D. A horizontal axis X-X runs along the centerline of the length XA of the plaque while the vertical axis Y-Y runs along the centerline of the width XB of the plaque. The recesses, as shown, are configured to be perforated in the perimeter of a single quadrant. For example the recess forming first pair 2, 3 of extended flat surface is located at the first quadrant A and the second pair 6, 7 of extended flat surfaces is limited to the fourth quadrant D.

Figure 3:
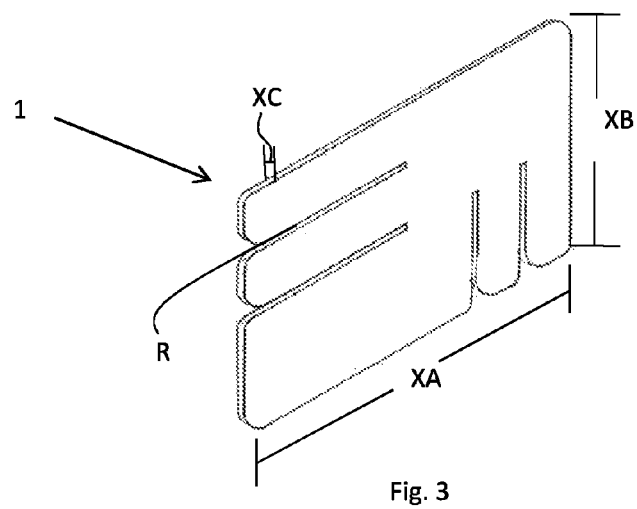
FIG. 3 isometric view of the structure of the first preferred embodiment of the present invention from a different angle.
Figure 4A:
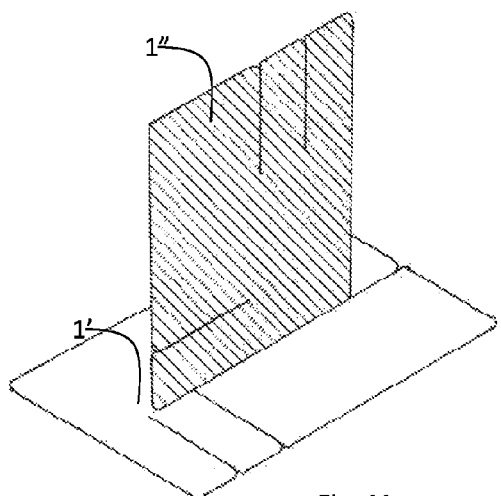
Figure 4B:
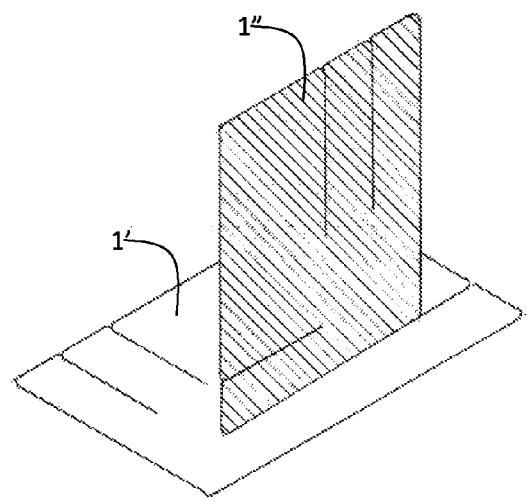

Each plaque is preferred to comprise the same configuration, as shown in FIG. 3, in order to provide single configuration to replicate for the manufacturing process. The present configuration allows for easy insertion of one plaque into the other.

FIG. 4A through 4I provides different arrangement of a pair of plaques. It is important to understand that the configuration, such as the recesses and extended flat surfaces 2, 3, 6, 7 configurations per quadrant assists the assembling of the plaques 1', 1".

In summary of the previous sections, the invention presented here is structurally innovative, presents advantages not available at the moment with existing culinary utensils, complies with all new patent application requirements and is hereby lawfully submitted to the patent bureau for review and the granting of the commensurate patent rights.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A portable stand system consisting of:

Two equally formed single solid rigid plaques, wherein each equally formed single solid plaque consists of four quadrants;

wherein each equally formed single solid plaque comprises a horizontal axis and a vertical axis;

wherein the horizontal axis extends horizontally along a horizontal centerline of the equally formed single solid rigid plaque and the vertical axis extends vertically along a vertical centerline of the equally formed single solid rigid plaque, and wherein the said four quadrants consist of:

a first quadrant located at the top half left of said equally formed single solid rigid plaque, a second quadrant located at the bottom half right of said equally formed single solid rigid plaque, a third quadrant located at the bottom half left of said equally formed single solid rigid plaque, a fourth quadrant located at the top half right of said equally formed single solid rigid plaque;

wherein said each equally formed single solid rigid plaque consists of a first perforated slot and a second perforated slot, wherein said first perforated slot consists of a first space and wherein said second perforated slot consists of a second space;

wherein said first perforated slot is located at said first quadrant along said horizontal centerline and wherein said first perforated slot extends from a perimeter of each solid rigid plaque towards the vertical centerline until reaching the said vertical centerline, wherein said second perforated slot is located in the same quadrant as said first perforated slot, wherein said second perforated slot is parallel to said first perforated slot, wherein said second perforated slot is the same length as said first perforated slot, wherein said second perforated slot extends from the perimeter of each equally formed single solid rigid plaque towards the vertical centerline until reaching the said vertical centerline;

wherein said each equally formed single solid rigid plaque consists of a third perforated slot and a fourth perforated slot, wherein said third perforated slot consists of a third space and wherein said fourth perforated slot consists of a fourth space;

wherein said third perforated slot is located at said second quadrant along said vertical centerline and wherein said third perforated slot extends from the perimeter of each solid rigid plaque towards the horizontal centerline until reaching the said horizontal centerline, wherein said fourth perforated slot is located in the same quadrant as said third perforated slot, wherein said fourth perforated slot is parallel to said third perforated slot, wherein said fourth perforated slot is the same length as said third perforated slot, wherein said fourth perforated slot extends from the perimeter of each equally formed single solid rigid plaque towards the horizontal centerline until reaching the said horizontal centerline;

and wherein said third quadrant consists of a solid flat surface; and said fourth quadrant consists of a solid flat surface.

* * * * *